US008306686B2

(12) United States Patent
Dlugoss et al.

(10) Patent No.: US 8,306,686 B2
(45) Date of Patent: Nov. 6, 2012

(54) GPS BASED VEHICLE MODIFICATION AND ABNORMAL USAGE MONITORING

(75) Inventors: Randall B. Dlugoss, Royal Oak, MI (US); Kenneth K. Lang, Saline, MI (US)

(73) Assignee: GM Global Technology Operations LLC

( * ) Notice: Subject to any disclaimer, the term of this patent is extended or adjusted under 35 U.S.C. 154(b) by 688 days.

(21) Appl. No.: 12/428,930

(22) Filed: Apr. 23, 2009

(65) Prior Publication Data

US 2010/0274432 A1 Oct. 28, 2010

(51) Int. Cl.
*G01M 17/00* (2006.01)

(52) U.S. Cl. ..................... 701/29.1; 701/29.2; 701/29.3; 701/29.6; 701/30.7; 701/32.4

(58) Field of Classification Search .................... 701/29, 701/213, 29.1, 29.2, 29.3, 29.6, 30.7, 30.8, 701/32.4

See application file for complete search history.

(56) References Cited

U.S. PATENT DOCUMENTS

| | | | | |
|---|---|---|---|---|
| 6,219,609 | B1 * | 4/2001 | Matsuno et al. | 701/72 |
| 7,418,372 | B2 * | 8/2008 | Nishira et al. | 703/2 |
| 2005/0267608 | A1 * | 12/2005 | Nishira et al. | 700/44 |
| 2008/0059034 | A1 * | 3/2008 | Lu | 701/71 |
| 2008/0086248 | A1 * | 4/2008 | Lu et al. | 701/41 |
| 2010/0262408 | A1 * | 10/2010 | Taguchi et al. | 703/8 |
| 2011/0106388 | A1 * | 5/2011 | Boeckenhoff et al. | 701/70 |

* cited by examiner

*Primary Examiner* — Toan To

(57) ABSTRACT

A vehicle monitoring system comprises a calculation module, an abnormal usage module, and memory. The calculation module calculates a vehicle usage value based on global positioning system (GPS) data and at least one data input, and calculates an expected vehicle usage value based on known vehicle characteristics and the GPS data. The abnormal usage module compares the vehicle usage value and the expected vehicle usage value. The memory stores an indicator based on the comparison.

10 Claims, 5 Drawing Sheets

GPS BASED VEHICLE MODIFICATION AND ABNORMAL USAGE MONITORING

FIELD

The present disclosure relates to GPS-based vehicle monitoring.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a global positioning system (GPS) navigation system is shown. A vehicle 100 includes a GPS receiver 102. GPS transmitters 104 transmit wireless signals. The GPS receiver 102 receives the wireless signals from the GPS transmitter 104 and determines a location of the vehicle 100. The GPS receiver 102 may also determine speed and direction of the vehicle 100 as well as time of day. The GPS receiver 102 outputs the GPS data to a navigation system 106.

The navigation system 106 processes the GPS data from the GPS receiver 102. The navigation system 106 displays a current location of the vehicle 100 on a display 108. The display 108 provides a visual indication of the location, speed, and direction of the vehicle 100 as well as the time of day to a user. The display 108 may include a touch screen, which allows the user to input data to the navigation system 106. For example, the user may select a location to plan a route.

SUMMARY

A vehicle monitoring system comprises a calculation module, an abnormal usage module, and memory. The calculation module calculates a vehicle usage value based on global positioning system (GPS) data and at least one data input, and calculates an expected vehicle usage value based on known vehicle characteristics and the GPS data.

The abnormal usage module compares the vehicle usage value and the expected vehicle usage value. The memory stores an indicator based on the comparison. In further features, the known vehicle characteristics include throttle, engine torque, wheel size, power transfer ratio, maximum load, and vehicle mass.

In other features, the memory stores the indicator when a predetermined difference between the vehicle usage value and the expected vehicle usage value is exceeded, and the indicator is indicative of unauthorized vehicle modification. In still other features, the memory stores the indicator when a predetermined difference between the vehicle usage value and the expected vehicle usage value is exceeded, and the indicator is indicative of unacceptable use due to vehicle overload.

In other features, the indicator is indicative of vehicle loss of integrity when the predetermined difference is exceeded for a period of time. In other features, the memory stores the indicator when the vehicle usage value is outside of a first range associated with the expected vehicle usage value. In still other features, the memory stores the indicator when the vehicle usage value is outside of a first range associated with the expected vehicle usage value for a period of time.

In still other features, the vehicle monitoring system further comprises a terrain database that stores terrain rating data, and at least one data input includes the terrain rating data. In further features, the memory stores the indicator when a predetermined difference between the vehicle usage value and the expected vehicle usage value is exceeded, and the indicator is indicative of unacceptable vehicle usage.

A GPS-based vehicle monitoring method comprises calculating a vehicle usage value based on global positioning system (GPS) data and at least one data input; calculating an expected vehicle usage value based on known vehicle characteristics and the GPS data; comparing the vehicle usage value and the expected vehicle usage value; and storing an indicator based on the comparison.

In further features, the known vehicle characteristics include throttle, engine torque, wheel size, power transfer ratio, maximum load, and vehicle mass. In other features, the GPS-based vehicle monitoring method further comprises storing the indicator when a predetermined difference between the vehicle usage value and the expected vehicle usage value is exceeded, and the indicator is indicative of unauthorized vehicle modification.

In other features, the GPS-based vehicle monitoring method further comprises storing the indicator when a predetermined difference between the vehicle usage value and the expected vehicle usage value is exceeded, and the indicator is indicative of unacceptable use due to vehicle overload.

In further features, the indicator is indicative of vehicle loss of integrity when the predetermined difference is exceeded for a period of time. In other features, the GPS-based vehicle monitoring method further comprises storing the indicator when the vehicle usage value is outside of a first range associated with the expected vehicle usage value.

In still other features, the GPS-based vehicle monitoring method further comprises storing the indicator when the vehicle usage value is outside of a first range associated with the expected vehicle usage value for a period of time. In still other features, the GPS-based vehicle monitoring method further comprises storing terrain rating data, and at least one data input includes the terrain rating data.

In further features, the GPS-based vehicle monitoring method further comprises storing the indicator when a predetermined difference between the vehicle usage value and the expected vehicle usage value is exceeded, and the indicator is indicative of unacceptable vehicle usage.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
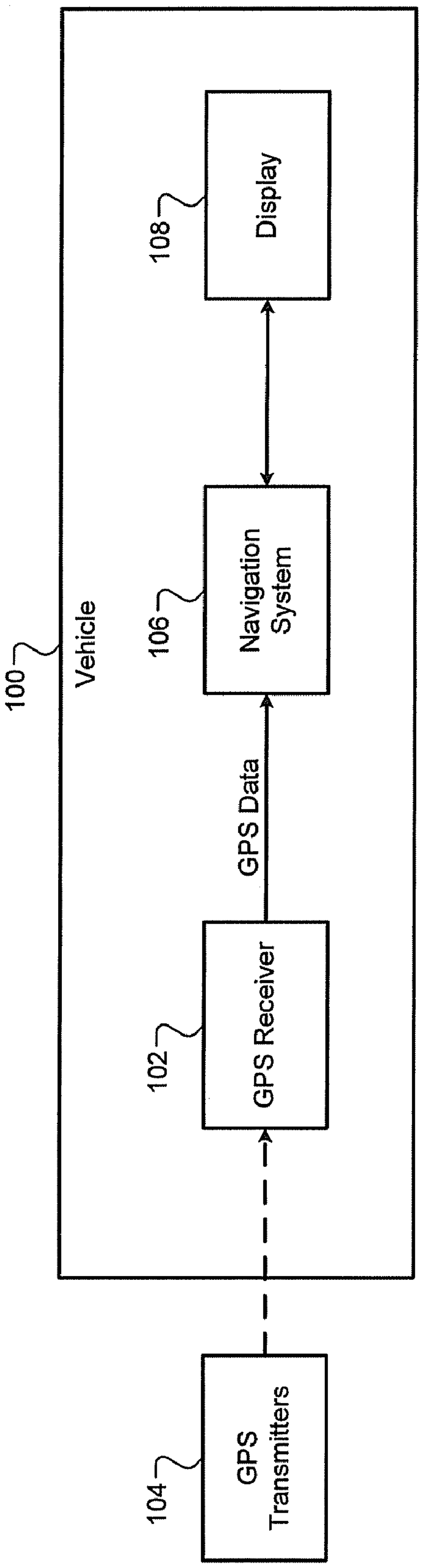
FIG. 1 Prior Art
FIG. 1 is a functional block diagram of a GPS navigation system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Vehicles are designed to reliably operate within certain operating parameters. For example, a vehicle powertrain may be designed to operate at a torque less than a specified maximum torque of an engine. Alterations may be made to the powertrain to increase engine torque. Increasing the engine torque may decrease the reliability of the powertrain. In some instances, the alterations may result in damage to the vehicle.

It may be difficult to determine whether the damage to the vehicle is caused by unauthorized use or normal degradation. Accordingly, a Global Positioning System (GPS) and sources that measure vehicle usage may be used to calculate a vehicle usage value. The calculated vehicle usage value may be compared to threshold values to determine whether the user has misused or made modifications to the vehicle.

Figure 2:
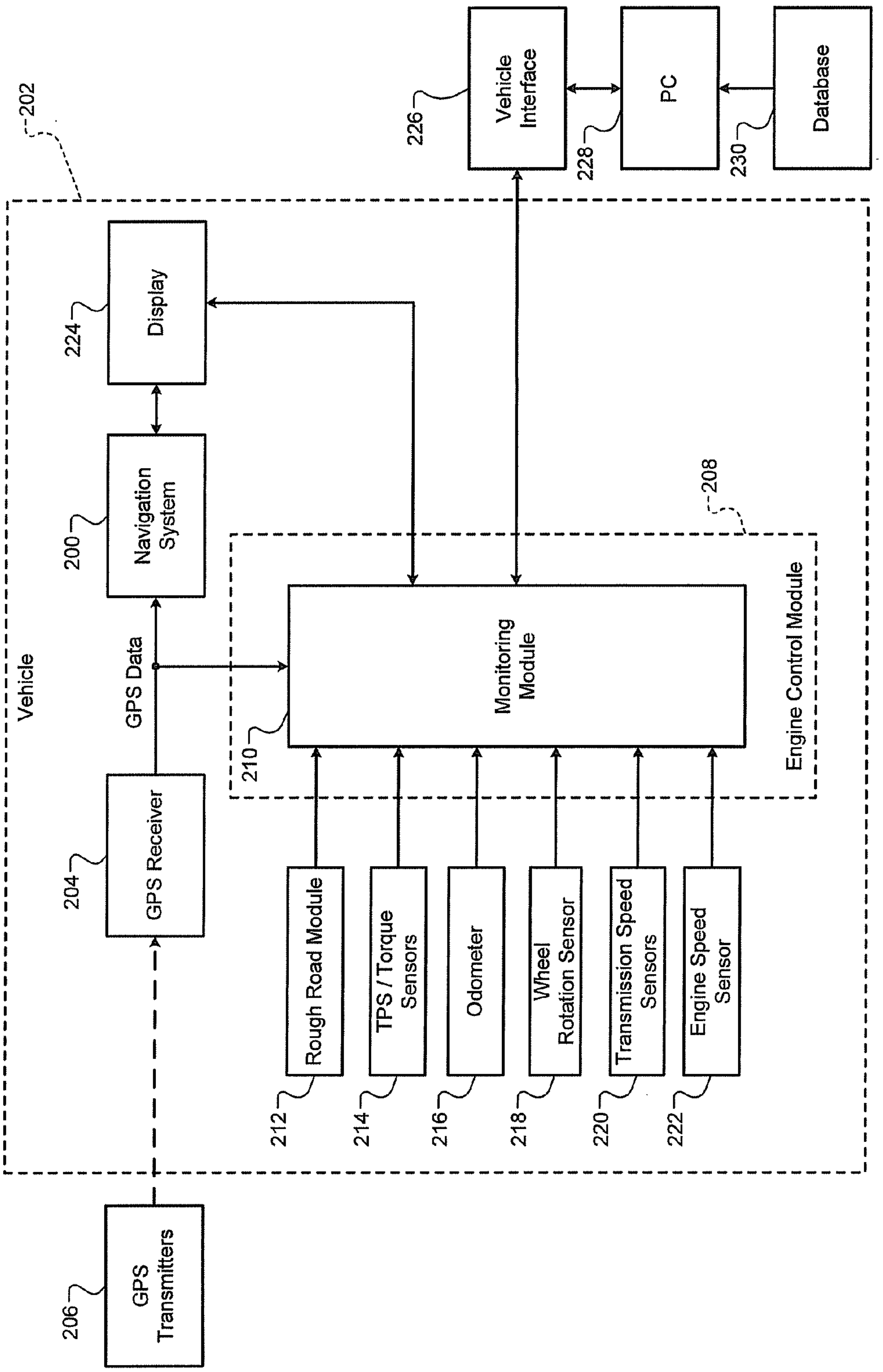
FIG. 2 is a functional block diagram of an exemplary GPS-based vehicle monitoring system according to the principles of the present disclosure.

Referring now to FIG. 2, a functional block diagram of an exemplary GPS-based vehicle monitoring system according to the principles of the present disclosure is shown. A GPS navigation system 200 may provide GPS data such as distance, location, and speed of a vehicle 202. The GPS data may be used to calculate other characteristics of the vehicle 202. For instance, by monitoring speed for a period of time, acceleration of the vehicle 202 may be determined. The calculations may be used to determine whether the vehicle 202 has been tampered with or misused.

A GPS receiver 204 collects the GPS data from GPS transmitters 206. The GPS data may be transmitted to the navigation system 200 and/or an engine control module (ECM) 208. The ECM 208 may use the GPS data to determine whether a user is misusing the vehicle 202 such as by driving on adverse terrain and/or overloading the vehicle 202.

A monitoring module 210 may be located within the ECM 208. Along with the GPS data from the GPS receiver 204, several sources may be transmitting data to the monitoring module 210. These sources may include, but are not limited to, a rough road module 212, throttle position/torque sensors 214, odometer 216, a wheel rotation sensor 218, transmission speed sensors 220, and an engine speed sensor 222 (in revolutions per minute (RPM)). The data from the sources may be raw or processed before entering the monitoring module 210. All of the data stated above may be stored and used by the monitoring module 210 to calculate the vehicle usage value.

The monitoring module 210 may determine whether the vehicle 202 is used inappropriately. For instance, the user might change a wheel diameter on the vehicle 202 to an unauthorized size. The GPS receiver 204 may determine that the vehicle 202 has travelled 1,000 miles at an average speed of 55 miles per hour. The odometer 216 may determine that the actual distance travelled is 900 miles and the wheel rotation sensor 218 may determine that the average speed is actually 45 miles per hour. This is evidence that the wheel diameter is larger than authorized.

The monitoring module 210 may determine whether a modification has been made. The monitoring module 210 may communicate with a display 224 to indicate a problem or the user may enter a code to display the results of the calculations on the display 224. In various implementations, the monitoring module 210 may communicate with a vehicle interface 226 to transmit the results of the calculations.

The vehicle interface 226 may be used to display the results to the user, to transmit the results to a personal computer (PC) 228, and/or to update nonvolatile memory data located in the monitoring module 210. The PC 228 may retrieve the results from the vehicle interface 226 and/or upload new data to the vehicle interface 226 that may be transferred to the monitoring module 210. For example, vehicle characteristics and threshold values may be stored on the PC 228. A database 230 may be updated on the PC 228 for transfer to the monitoring module 210. The database 230 may include a terrain rating system that provides a rating for a location. In various implementations, the database may be internal or external to the PC 228.

Figure 3:
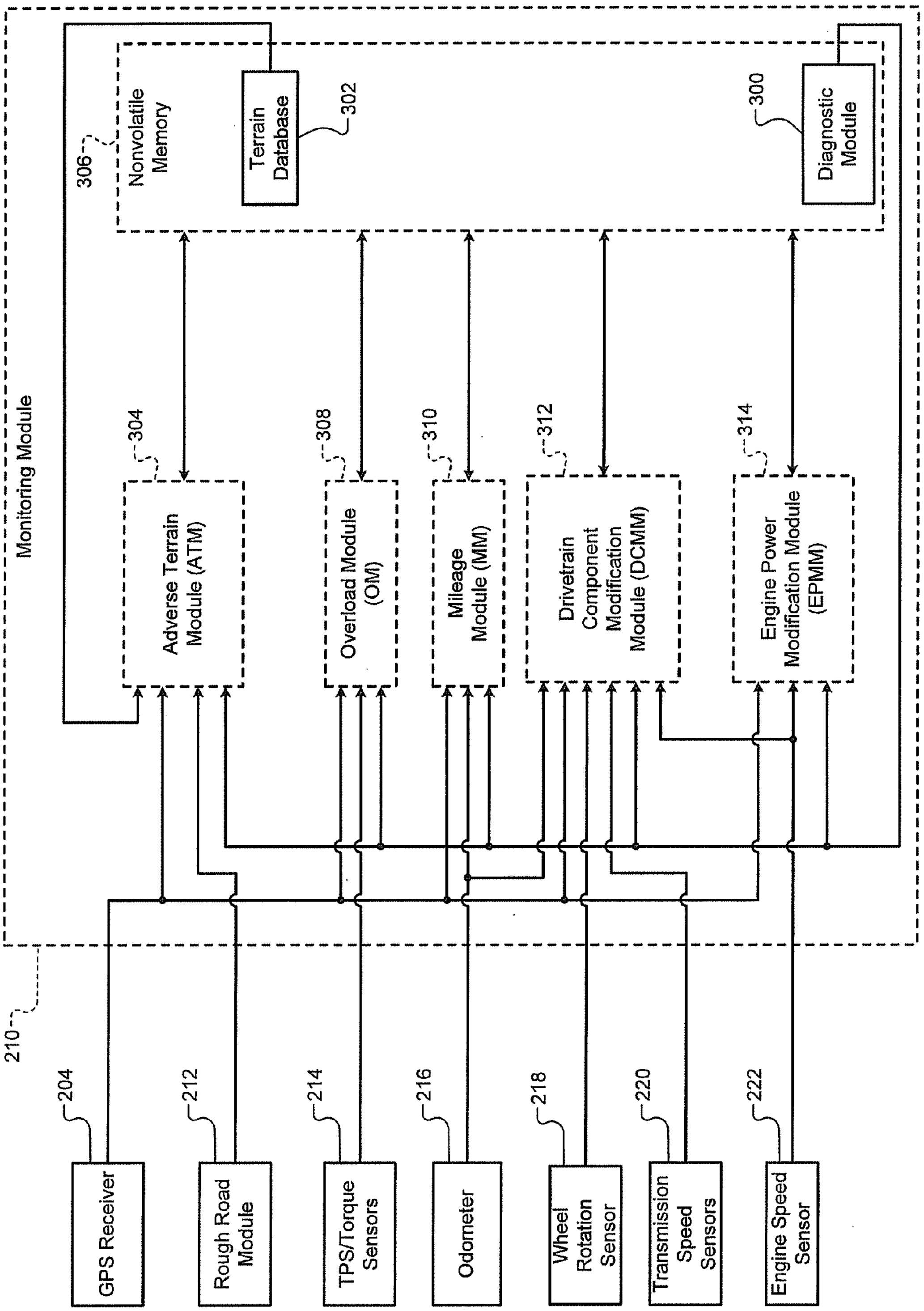
FIG. 3 is a functional block diagram of an exemplary implementation of the monitoring module 210 of FIG. 2.

In FIG. 3, an exemplary implementation of the monitoring module 210 of FIG. 2 is shown. Calculations may be done by using algorithms that may include the GPS data from the GPS receiver 204, data from the sources, a diagnostic module 300, and a terrain database 302. The calculations determine actual and expected values of vehicle usage. For example, an adverse terrain module (ATM) 304 may use the data from the GPS receiver 204, the terrain database 302, the diagnostic module 300, and the rough road module 212 to determine whether the vehicle 202 has been driven on an unauthorized terrain.

The terrain database 302 includes a database that may associate a number to a given type of terrain or a location. The database may be as simple as storing a 1 for locations that are unacceptable and a 0 for locations that are acceptable. In various implementations, the database may include a detailed rating system. For example, a location that is acceptable may have a 0 rating and a highly unacceptable location may have a 10 rating. The vehicle 202 may be operated in a location that is associated with a rating that is within 0 and 10.

The rough road module 212 may determine road conditions. For example, the rough road module 212 may detect when the user may be driving on terrain that is uneven. This data may be used by the ATM 304 to determine whether the vehicle 202 is being used on terrain that is unacceptably rough for the vehicle 202.

The diagnostic module 300 may include diagnostics of the sources. Diagnostics determine whether the sources are working properly. The diagnostic module 300 determines whether the data received from the sources is reliable and notifies the ATM 304. If the sources are working properly, calculations may begin; otherwise, the calculations may be suspended and an indicator may be stored. For example, a data flag may be set or the time of day, location, or date may be stored.

The GPS data may be used by the ATM 304 to compare against the terrain database 302. By knowing the location of the vehicle 202, the ATM 304 may look up the terrain rating for the same location within the terrain database 302. The GPS data may determine the time of day and location of the occurrence. The ATM 304 transmits the results to a nonvolatile memory 306 to be stored.

An overload module (OM) 308 may use data from the GPS receiver 204, the throttle position/torque sensors 214, and the diagnostic module 300 to determine whether the vehicle 202 has been overloaded. For example, the throttle/torque sensors 214 may monitor the positioning of a throttle to determine a torque request by the user. Based on original vehicle characteristics of the vehicle 202, the vehicle 202 should have an acceleration within a predetermined range.

The original vehicle characteristics are based on known parameters of components originally installed on the vehicle 202. For example only, original vehicle characteristics may include throttle, engine torque, wheel size, power transfer ratios, maximum load, and vehicle mass. The GPS data may be used to calculate the actual acceleration of the vehicle 202. If the actual acceleration is less than the minimum acceleration, then the vehicle 202 may have been overloaded.

A mileage module (MM) 310 may use data from the GPS receiver 204, the odometer 216, and the diagnostic module 300 to determine whether there is a difference in mileage. For example, the GPS data may indicate that the vehicle 202 has travelled 1,000 miles. If the odometer 216 indicates that the vehicle 202 has travelled 500 miles, then a modification may have occurred.

A drivetrain component modification module (DCMM) 312 may use data from the GPS receiver 204, the wheel rotation sensor 218, the transmission speed sensors 220, the engine speed sensor 222, and the diagnostic module 300 to determine whether a drivetrain component has been modified. For example, the GPS data, the odometer 216, the wheel rotation sensor 218, and the engine speed sensor 22 may indicate that the average speed of the vehicle 202 is 55 miles per hour. If the transmission speed sensors 220 indicate that the transmission output speed should translate into a vehicle speed of 45 miles per hour, then a modification may have been made to the drivetrain.

An engine power modification module (EPMM) 314 may use data from the GPS receiver 204, the engine speed sensor 222, and the diagnostic module 300 to determine whether a modification has been made to increase or decrease power of an engine. For example, based on the original vehicle characteristics of the engine, a maximum speed output is known. If the engine speed sensor 222 determines that the actual engine speed is greater than the maximum, then a modification may have been made.

While individual modules may be used to monitor a component, system, or groups of systems, they may be categorized together based on similar functionality. For example only, the ATM 304, the OM 308, the MM 310, the DCMM 312, and the EPMM 314 shown in FIG. 3 may be categorized as unauthorized usage and modification modules. Unauthorized usage and modification modules are not limited to the ones named above or shown in FIG. 3. In various implementations, a single unauthorized usage and modification module may be used to monitor more than one component, system, or group of systems.

Figure 4:
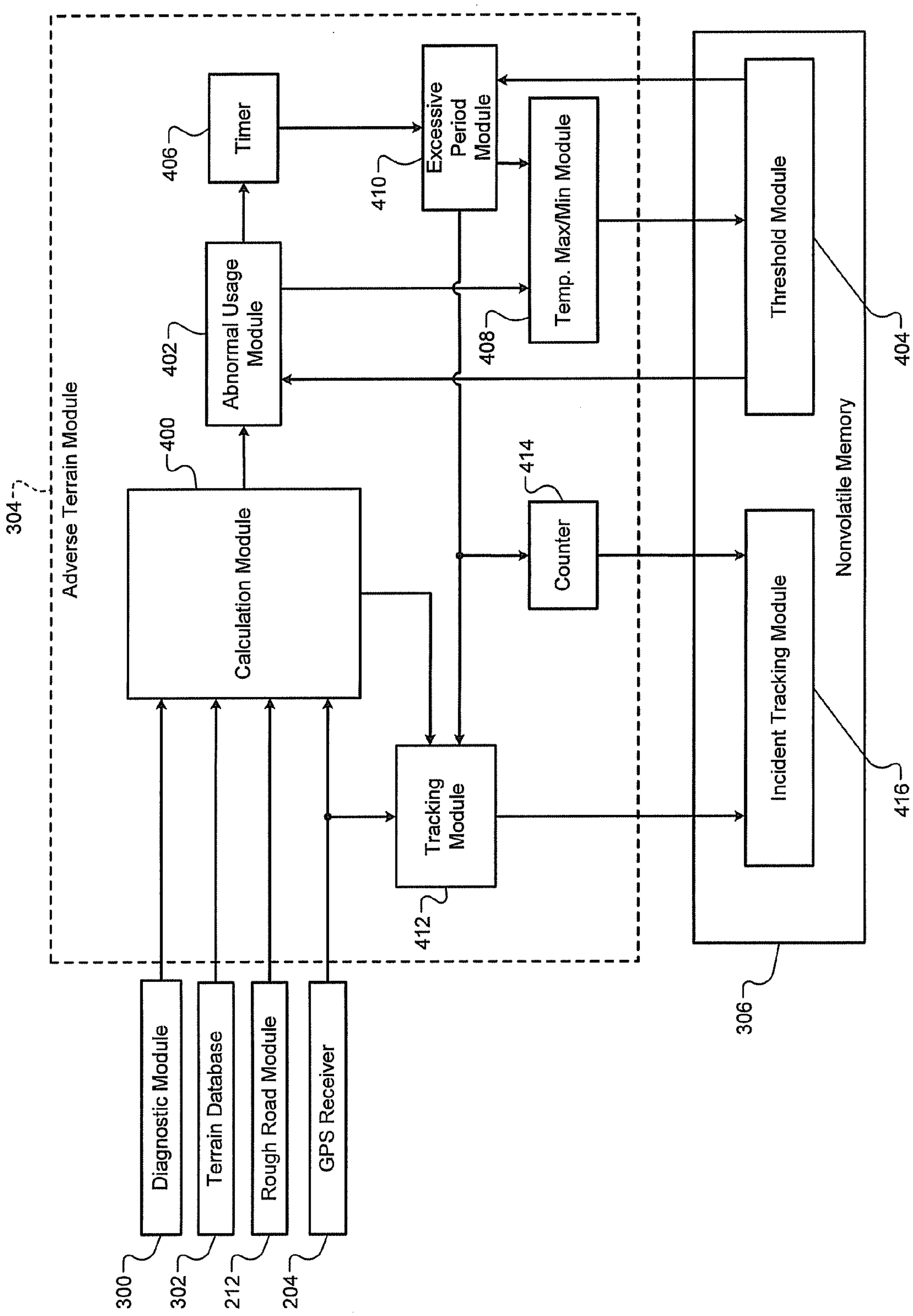
FIG. 4 is a functional block diagram of an exemplary implementation of the adverse terrain module 304 of FIG. 3.

Referring now to FIG. 4, an exemplary implementation of the ATM 304 of FIG. 3 is shown. The diagnostic module 300, the terrain database 302, the rough road module 212, and the GPS receiver 204 transmit data to a calculation module 400. The diagnostic module 300 determines whether the incoming data is reliable for calculations and/or comparisons and notifies the calculation module 400. If the data is not reliable, meaning at least one of the data sources is not functioning properly, then the calculation module 400 may suspend calculations and comparisons and an indicator may be stored in the nonvolatile memory 306.

If the data is reliable, then the calculation module 400 calculates the vehicle usage value based on the data. The calculation module 400 may receive the original vehicle characteristics and calculate the vehicle usage value. The vehicle usage value is compared to a threshold value and a previous maximum and/or minimum value in an abnormal usage module 402. More than one threshold may exist for a given component, system, or group of systems that is being monitored. For example, a maximum threshold value and a minimum threshold value for engine power may exist to determine whether the engine of the vehicle 202 has been unacceptably upgraded or changed. The threshold values (predetermined range of values) and previous maximum and minimum values may be stored in a threshold module 404.

The abnormal usage module 402 determines whether the vehicle usage value lies within the predetermined range of values. When the vehicle usage value lies outside of the predetermined range, a timer 406 may be started. The vehicle usage value may be compared to previous max/min values to determine whether a new max/min exists. The previous max/min values may be stored in the threshold module 404. If the vehicle usage value is beyond the previous max/min value, then the vehicle usage value may be stored in a temporary max/min module 408. The temporary max/min module 408 compares the vehicle usage value with previously stored max/min values from the threshold module 404 and replaces the max/min values if necessary. The temporary max/min module 408 may replace the max/min values when the vehicle 202 is turned off.

The timer 406 calculates a period of time that the vehicle usage value lies outside of the predetermined range of values. The period is transmitted to an excessive period module 410. The excessive period module 410 compares the period with a threshold period and a previous maximum period from the threshold module 404. If the period is greater than the previous maximum period, then the excessive period module 410 transmits the period to the temporary max/min module 408 for storage. If the period is greater than the threshold period, then a tracking module 412 and a counter 414 may be initialized.

The counter 414 determines how many times the user has misused or modified the vehicle 202 and may be incremented when the predetermined range of values and threshold period are exceeded. For example, the threshold value for grade of terrain may be 30° and the threshold period may be 45 seconds. When the user operates the vehicle 202 over a hill with a grade of 30° for only 10 seconds, then the counter 414 may not increment. In various implementations, the counter 414 may increment when at least one of the predetermined range of values and threshold period is exceeded. The counter 414 is initiated at the same time as the tracking module 412.

The tracking module 412 records the location, date, and time of day of an occurrence of vehicle misuse or modification. For example, when an occurrence of vehicle misuse or modification is determined, a record of the time of day, date, and location of the event may be useful. The tracking module 412 transmits the results to an incident tracking module 416 for storage. In other implementations, an indicator such as those previously mentioned may be stored. The tracking module 412 may transmit the time of day, location, and date to the incident tracking module 416 when an error in calculations has occurred or when calculations are suspended.

In unauthorized usage and modification modules, the calculation module 400 may calculate an expected vehicle usage value based on the data from the sources and the original vehicle characteristics. The original vehicle characteristics may be stored in the threshold module 404. The calculation module 400 may calculate a range of values based on the expected vehicle usage value and transmit the range of values to the abnormal usage module 402. The abnormal usage module 402 may compare the vehicle usage value and the range of values.

Figure 5:
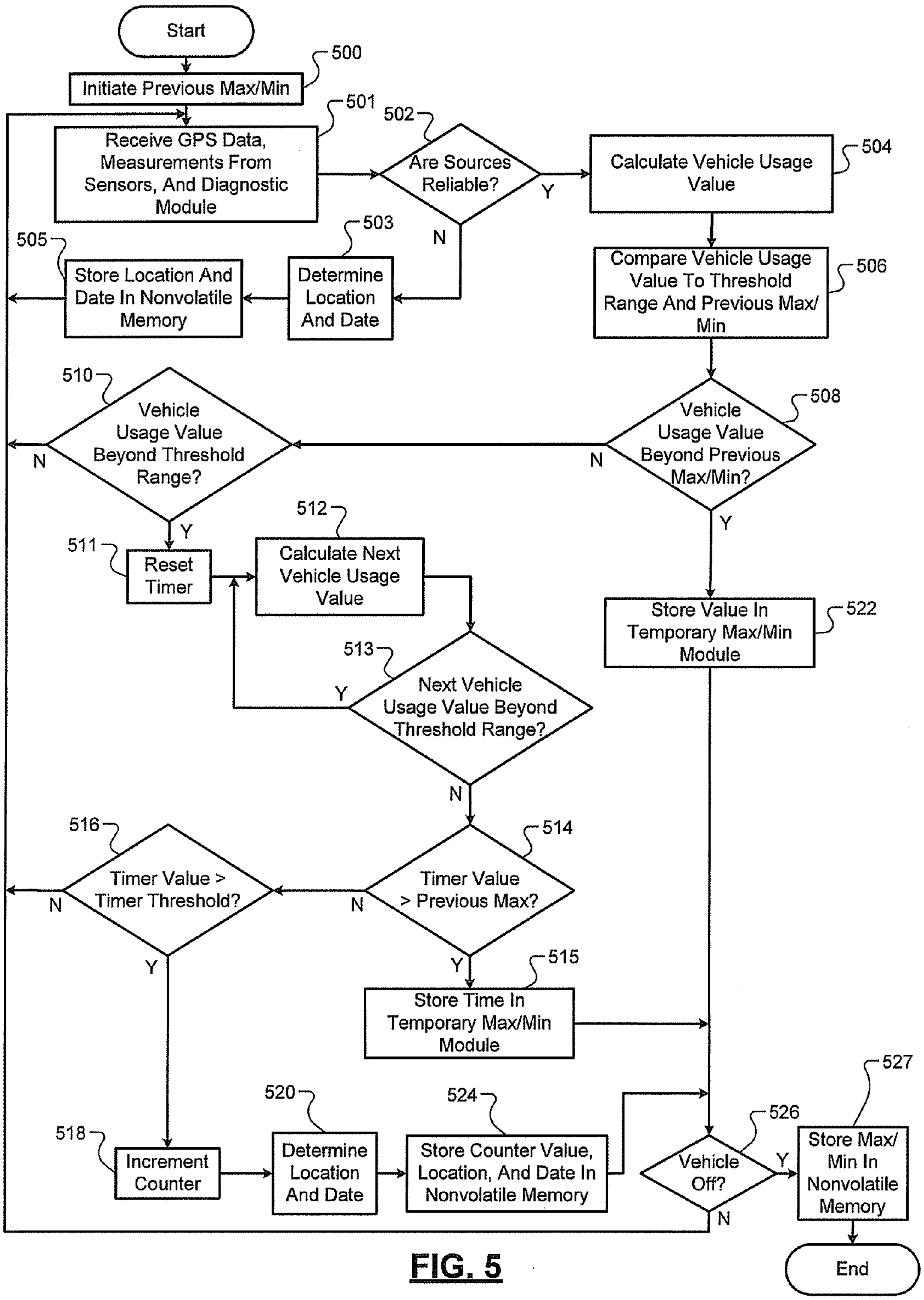
FIG. 5 is a flowchart that depicts exemplary steps of a GPS-based vehicle monitoring method according to the principles of the present disclosure.

In FIG. 5, a flowchart that depicts exemplary steps of a GPS-based vehicle monitoring method according to the principles of the present disclosure is shown. Control begins in step 500, where control initiates a previous maximum/minimum value. In step 501, control receives GPS data, data from the sources, and diagnostics for calculations and comparisons. In step 502, control determines whether the GPS data and the data from the sources are reliable. If the GPS data and the data from the sources are reliable, control transfers to step 504; otherwise, control transfers to step 503. In step 503, control determines location and date. In step 505, control stores the location and date in nonvolatile memory.

In step 504, control calculates a vehicle usage value using the GPS data and the data from the sources. In step 506, control compares the vehicle usage value to a predetermined range of values and a previous maximum/minimum value. In step 508, control determines whether the vehicle usage value is beyond the previous maximum/minimum value. If the vehicle usage value is not beyond the previous maximum/minimum value, then control transfers to step 510; otherwise, control transfers to step 522. In step 522, control stores the vehicle usage value in a temporary max/min module.

In step 510, control determines whether the vehicle usage value is beyond the predetermined range of values. If the calculated value is not beyond the predetermined range, control returns to step 501; otherwise, control transfers to step 511. In step 511, a timer is reset. In step 512, control calculates a next vehicle usage value. In step 513, control compares the next vehicle usage value to the predetermined range of values. If the next vehicle usage value is beyond the predetermined range of values, then control returns to step 512; otherwise, control continues in step 514.

In step 514, control compares the timer value to a previous maximum period. If the timer value is greater than the previous maximum period, then control transfers to step 515; otherwise, control transfers to step 516. In step 515, control stores the timer value in the temporary max/min module.

In step 516, control compares the timer value to a threshold period. If the timer value is less than the threshold period, then control returns to step 500; otherwise, control transfers to step 518. In step 518, control increments a counter. In step 520, control determines location and date. In step 524, control stores the counter value, location, and date in nonvolatile memory.

In step 526, control determines whether the vehicle has powered down. If the vehicle has powered down, control transfers to step 527; otherwise, control returns to step 501. In step 527, control records the maximum and minimum values.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A vehicle monitoring system comprising:

a calculation module that calculates a vehicle usage value based on global positioning system (GPS) data and at least one data input, and that calculates an expected vehicle usage value based on known vehicle characteristics and said GPS data;

an abnormal usage module that compares said vehicle usage value and said expected vehicle usage value; and memory that stores an indicator based on said comparison.

2. The vehicle monitoring system of claim 1 wherein said known vehicle characteristics include throttle, engine torque, wheel size, power transfer ratio, maximum load, and vehicle mass.

3. The vehicle monitoring system of claim 1 wherein said memory stores said indicator when a predetermined difference between said vehicle usage value and said expected vehicle usage value is exceeded, and wherein said indicator is indicative of unauthorized vehicle modification.

4. The vehicle monitoring system of claim 1 wherein said memory stores said indicator when a predetermined difference between said vehicle usage value and said expected vehicle usage value is exceeded, and wherein said indicator is indicative of unacceptable use due to vehicle overload.

5. The vehicle monitoring system of claim 3 wherein said indicator is indicative of vehicle loss of integrity when said predetermined difference is exceeded for a period of time.

6. The vehicle monitoring system of claim 4 wherein said indicator is indicative of vehicle loss of integrity when said predetermined difference is exceeded for a period of time.

7. The vehicle monitoring system of claim 1 wherein said memory stores said indicator when said vehicle usage value is outside of a first range associated with said expected vehicle usage value.

8. The vehicle monitoring system of claim 1 wherein said memory stores said indicator when said vehicle usage value is outside of a first range associated with said expected vehicle usage value for a period of time.

9. The vehicle monitoring system of claim 1 further comprising a terrain database that stores terrain rating data, wherein said at least one data input includes said terrain rating data.

10. The vehicle monitoring system of claim 9 wherein said memory stores said indicator when a predetermined difference between said vehicle usage value and said expected vehicle usage value is exceeded, and wherein said indicator is indicative of unacceptable vehicle usage.

* * * * *